(12) United States Patent
Yamashita et al.

(10) Patent No.: US 7,818,749 B2
(45) Date of Patent: Oct. 19, 2010

(54) DATA PROCESSING METHOD, DATA PROCESSING APPARATUS, AND DATA PROCESSING PROGRAM

(75) Inventors: Nobuyuki Yamashita, Yokohama (JP); Yukio Nakano, Oyama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/192,947

(22) Filed: Aug. 15, 2008

(65) Prior Publication Data

US 2008/0320494 A1 Dec. 25, 2008

Related U.S. Application Data

(63) Continuation of application No. 10/152,439, filed on May 20, 2002, now abandoned.

(30) Foreign Application Priority Data

Mar. 18, 2002 (JP) .............................. 2002-073540

(51) Int. Cl.
*G06F 9/46* (2006.01)

(52) U.S. Cl. ........................ 718/104; 718/100; 718/102; 707/705

(58) Field of Classification Search ................... 718/104
See application file for complete search history.

(56) References Cited

U.S. PATENT DOCUMENTS

| | | | |
|---|---|---|---|
| 5,551,028 A | 8/1996 | Voll et al. | |
| 5,553,267 A | 9/1996 | Herlihy | |
| 5,832,484 A | 11/1998 | Sankaran et al. | |
| 5,940,083 A | 8/1999 | Broekhuijsen | |
| 5,995,998 A * | 11/1999 | Furlani et al. | ................ 718/102 |
| 6,026,401 A | 2/2000 | Brealey et al. | |
| 6,272,491 B1 | 8/2001 | Chan et al. | |
| 6,343,296 B1 | 1/2002 | Lakhamraju et al. | |
| 6,594,683 B1 * | 7/2003 | Furlani et al. | ................ 718/102 |
| 6,618,744 B1 | 9/2003 | Simmons et al. | |
| 6,708,195 B1 | 3/2004 | Borman et al. | |
| 6,735,760 B1 | 5/2004 | Dice | |
| 6,792,601 B1 | 9/2004 | Dimpsey et al. | |
| 6,973,656 B1 | 12/2005 | Huynh et al. | |
| 2002/0010711 A1 | 1/2002 | Nakanishi et al. | |
| 2006/0059496 A1 | 3/2006 | Joy et al. | |

OTHER PUBLICATIONS

Jim Gray, et al "Lock Implementation", Transaction Processing: Concepts and Techniques (1993), Morgan Kaufmann Publishers, Inc. (San Mateo, CA), pp. 449-485.

* cited by examiner

*Primary Examiner*—Li B Zhen
(74) *Attorney, Agent, or Firm*—Townsend and Townsend and Crew LLP

(57) ABSTRACT

In reference, update, and insertion processing, the lock of an un-transferred object is released, and then the lock of a transferred object is set when the pointer is traced for transfer between objects to thereby improve the parallel execution capability of the reference, update, and insertion. At that time, the IS-mode (in the case of reference processing) or the IX-mode (in the case of update and insertion processing) is set at the starting of the processing, and the lock is released at the time of completion of the processing. Furthermore, in deletion processing, after the pointer to a deletion target is separated or replaced and all the processing that acquires the lock of an object group has been completed, the region of the deletion target object is released.

6 Claims, 9 Drawing Sheets

DATA PROCESSING METHOD, DATA PROCESSING APPARATUS, AND DATA PROCESSING PROGRAM

CROSS REFERENCE TO RELATED APPLICATION

This application is a continuation of U.S. patent application Ser. No. 10/152,439, filed on May 20, 2002 now abandoned; which claims priority to Japanese Patent Application No. 2002-073540, filed on Mar. 18, 2002; all of which is incorporated herein by reference.

BACKGROUND OF THE INVENTION

This invention relates to data processing of a system having the data structure in which a plurality of objects are correlated by the pointer that operates a plurality of process in parallel that is served to refer, update, insert, and delete the object.

1. Related Art 1

The data management system having a function to take access quickly to the data by means of the index related to the present invention provides the following four functions as the method to take access to the basic data.

(1) reference function: reference to the data correlated to a specified key value (2) insertion function: insertion of a specified key value and insertion of the specified data correlated to the specified key value (3) deletion function: deletion of a specified key value and the data correlated to the specified key value (4) update function: update of the data correlated to a specified key value to the specified data A plurality of these functions are requested for processing in parallel. The processing method for realizing the respective functions is called as reference processing, insertion processing, deletion processing, and update processing.

Conventional technique used for realizing these functions will be described with reference to FIG. 1 and FIG. 2. Numeral 101 shown in FIG. 1 is an exemplary data structure. The numeral 101 shows an object group T comprising three objects A, B, and C. The object is the data unit, and the region is secured and released in object units. Furthermore, one data is stored in one object.

The object B stores the key value 10 and the data correlated to the key value 10. Similarly, the object C stores the key value 20 and the data correlated to the key value 20. The object A stores the key held by the object B (namely the key value 10), the storage position information of the object B (referred to as pointer hereinafter), and the key held by the object C (namely the key value 20) and the pointer of the object C.

A method for realizing the above-mentioned four functions will be described herein under. It is required to set and release the lock in order to realize parallel operation of a plurality of the functions. A method for realization of the lock is described in, for example, "Gray, J. Reuter, A. TRANSACTION PROCESSING: CONCEPTS AND TECHNIQUES, Morgan Kaufmann Publishers, Inc., 1993, p 449-484". Herein, the lock of the respective S, X, IS, and IX modes locking described in the above-mentioned literature is used. The S-mode locking can be executed together with the IS-mode locking in parallel, the X-mode cannot be executed with locking in all modes in parallel, the IS-mode locking can be executed together with locking of S, IS, and IX modes in parallel, and the IX-mode locking can be executed together with the lock of IS and IX modes. The lock is set hierarchically in the strategy of lock setting. In detail, the IS-mode lock is set to the object group T in the case of the reference processing, the IX-mode lock is set to the object group T in the case of the insertion, deletion, and update processing, and the S-mode lock is set in the case of the reference to an object that takes access thereafter and the X-mode lock is set in the case of the update (probable). In other words, the lock is set to the object group, and thereafter the lock is set to a specified object.

The resource name used when the lock is set to the object group that is known commonly for all the respective processing is assigned. Furthermore, in the case that the lock is set to an object, the resource name corresponding to the storage position of the object (position information of the resource name where the object is stored, for example, pointer value) is assigned. In other wards, it is possible to set the lock to an object if the storage position is found. All the processing knows the storage position of the object (object A in FIG. 1) located at the origin in the object group, and the storage point is not moved.

The time chart of the respective processing is shown in FIG. 2. The time on these time charts elapses from the left to the right. A line segment having black circles on both ends represents a time period while the lock is being set to the object shown on the left side of the line segment, and the lock mode is shown above the line segment and the processing is shown under the line segment. A line segment having white circles on both ends represents the time period while the object shown on the left side of the line segment is being accessed (without setting the lock), and the processing is shown under the line segment. FIG. 2A shows a flow chart of reference processing. Herein, an example in which the object having the key value of 10 is referred is shown. FIG. 2B shows a flow chart of insertion processing. Herein, an example in which the object having the key value of 30 is inserted into the group T is shown. FIG. 2C shows a flow chart of deletion processing. Herein, an example in which the object having the key value of 20 is deleted is shown. FIG. 2D shows a flow chart of update processing. Herein, an example in which the object having the key value of 10 is updated is shown.

To show the situation of the parallel processing, an exemplary case in which, for example, insertion processing of the key value of 30 and deletion processing of the key value of 20 are operated simultaneously is described. In the insertion processing 202, at first the IX-mode lock is set to the object group T. The object region for storing the new data is allocated (object D), and the key value 30 and correlated data are set in the region. On the other hand, in the deletion processing 203, the IX-mode lock is set similarly to the object group T, the lock is allowed to accept parallel execution even though the lock competes with IX in the insertion processing, and it is not the case in which any one of processing must wait. Next, in both the insertion processing 202 and the deletion processing 203, the X-mode lock is set to the object A, the one processing has set the lock at first, and the other processing must wait to set the lock until the one processing that has set the lock at first releases the lock.

At first, the case in which the deletion processing 203 successively set the lock prior to the insertion processing 202 will be described herein under. The insertion processing must wait until the deletion processing 203 releases the lock of the object A. The deletion processing 203 takes access to the object A to thereby acquire the pointer to the object B corresponding to the key value of 20, sets the X-mode lock to the object C, deletes the key value of 20 in the object A and the pointer to the object C (referred to as removal of the pointer hereinafter) to thereby release the lock to the object A (at this time point, waiting of the insertion processing 202 is released), the object region that stores the object C is released and the lock of the object C is released, and the lock of the object group T is released finally. This final state is shown in FIG. 102.

In response to release of the lock of the object A in the deletion processing 203, in the insertion processing 202 the lock of the object A is set successfully. In the insertion processing 202, the object A accepts an access, the key value 30 and the storage position of the object D are set to the object A, the lock of the object A is released, and the lock set to the object group T is released. This state is shown in 104 of FIG. 1.

On the other hand, in the case that the lock is set successfully prior to the deletion processing in the insertion processing 202, the deletion processing 203 must wait until the lock of the object A is released in the insertion processing 202. The insertion processing 202 carries out the processing in the same manner as described hereinabove, and the state 103 shown in FIG. 1 is brought about. Thereafter, the deletion processing is executed, and 104 shown in FIG. 1 is brought about.

The reference processing (key value of 10) is shown in 201 shown in FIG. 2A, and the update processing (key value of 10) is shown in 204 shown in FIG. 2D. The reason why the lock of the object B has been set before the lock of the object A is released in the reference processing 201 and the update processing 204 is that the error operation is to be prevented when deletion processing of the object B is operated in parallel. In detail, for example, if the lock of the object B is set after the lock of the object A is released, it is possible to release the region of the object B carrying out by the deletion processing during the release, and furthermore the released region is re-allocated to other use and the data that is set in the region is regarded by mistake as the data of the object B to cause error operation.

Another method in which the X-mode lock is set to the object group T for insertion, deletion, and update of the S-mode lock on the object group T may be employed as an easy method for the reference processing. Because parallel processing cannot be executed by means of the above-mentioned method excepting in the case that the reference processing is executed in parallel with another reference processing, the resources such as disk and processor is used not effectively in comparison with the above-mentioned example, and the throughput and response time are poor.

As described hereinbefore, though the related art 1 is advantageous in that the object is deleted by setting the lock to two objects simultaneously, for example, the object B is locked in the state that the object A is being locked, and the region of the object that has been deleted is released, however, the related art 1 is disadvantageous in that the parallel execution performance is somewhat poor.

2. Related Art 2

B-tree index in the DB management system has the data structure that is formed by expanding from the related art 1. 701 in FIG. 7 shows an exemplary three-step B-tree index comprising 7 pages (equivalent to the object in the related art 1). Pages P4, P5, P6, and P7 located at the bottom of 701 are called as leaf page, and store a pair of one or more keys (values appears at the bottom on a page, for example, key value of 50 and key value of 70 on page P6) and storage position information of the corresponding data, the pointer of the page on the right side (excepting the rightmost pate P7), the Max key value in the page (the value appears at the upper right in the leaf page), and the maximum key value of the data stored in the page (for example, the key value of 20 is the Max key value in the page P4) respectively. The key range that is to be store is set to each leaf page, and it is shown by the in-page Max key value of the corresponding page and the page positioned at the right side of the corresponding page. For example, the key range of the page P5 that is to be stored is larger than the in-page Max key value of 20 of the page P4 that is positioned at the left side of the page P5, and smaller than or equal to the in-page Max key value of 40 of the page P5. Similarly, the key range that is to be stored in the pages P6 and P7 is the key larger than 40 and smaller than or equal to 70, and larger than 70 respectively. The page P4 that has no page positioned on the left side is served to store the key smaller than or equal to in-page Max key value (smaller than or equal to 20).

The page called as upper page (the page P1, page P2, and page P3 of 701 in FIG. 7, called as node) is arranged above the leaf page. The upper page stores a pair of one or more pointers to the page located immediately under it and a key value, and the pointer to the page located on the right side (if there is). Herein, the key value is identical with the in-page Max key value of the page pointed by the pair of pointers. Particularly, the page P1 is called as root page. To search the leaf page in which a certain key value is stored, it is the way that an access is taken from the root page and the pointer that is paired with the minimum key value that is larger than the target key value is traced. The region is secured in page units.

The deletion processing in which the key value in a range from 20 to 40 will be described with reference to 801 in FIG. 8A. At first, the IX-mode lock is set to the whole B-tree index T and the S-mode lock is set to the root page P1, the pointer to the page P2 that is paired with the key value of 40 that is larger than the key value of 20, which is the lower limit of the specified range, and is the minimum key value in the P1 is acquired, and the lock of the page P1 is released. The S-mode lock is set to the page P2, the pointer to the page P4 that is paired with the key value of 20 that is larger than the key value of 20 and is the minimum key value in the page P2 is acquired, and the lock of the page P2 is released. The X-mode lock is set to the page 4, and all the keys in a range from the key value of 20 to 40, which are the target in the page P4 to be deleted, are deleted.

At that time, because only the key value of 20 exists in the page P4, no key remains in the page, and the region of the page P4 is not released. The significant reason is that it is required to reset the pointer to the target page to be released while a suitable lock is being set, and this resetting causes the poor parallel execution performance.

Because the in-page Max key value of the page P4 is 20 and it is known that the value larger than 20 out of the range of key value from 20 to 40, which is the target to be deleted, is stored in the right side page, the pointer to the right page (pointer to the page P5) is acquired, and the lock of the page P4 is released. The X-mode lock is set to the page P5, and all the key values in the rage of key value from 20 to 40, which are the target to be deleted in the page P5, are deleted. At that time, because there is only the key value of 40 in the page P5, no key value remains in the page, the region of the page P5 is not released. Because the in-page Max key value of the page P5 is 40, all the keys in the rage of key value from 20 to 40 are deleted. The lock of the page P5 is released, and the lock of the whole B-tree index T is released finally to complete the deletion processing. The state in which the deletion processing has been completed is shown in 702 in FIG. 7.

Furthermore, the procedure for carrying out the insertion processing (key value of 60) starting from the state of 702 in FIG. 7 will be described in 802 shown in FIG. 8. The IX-mode lock is set to the whole B-tree index T and the page is accessed to the page P1 and page P3 in the same manner as described hereinabove, the X-mode lock is set to the page P6, and the page P6 is accessed. It is assumed that the data of the key value of 50 and 70 has been stored already in the page P6, and the page P has no sufficient space for storing the data of the key value of 60. In this case, the page division processing called as splitting is carried out. At first, a page (assumed to be the page P8) is secured additionally. Herein, the divided key value is assumed to be 50. In detail, the data of the key value of 50 remains in the page P6, the data of the key value of 70 and the data of the key value of 60 to be inserted are transferred to the page region that has been secured additionally. The required setting is carried out to the page P8, the in-page Max key value of the page P6 is reset to 50, and the pointer on the right page is reset to the page P8. Thereafter, the lock of the page P6 is released, the X-mode lock is set to the page P3 to reset the pointer, the lock of the page P3 is released, and the lock of the whole B-tree index T is released finally to complete the insertion processing. The state in which the insertion processing has been completed is shown in 703 in FIG. 7.

As described hereinbefore, to maintain the high parallel execution performance of the B-tree index, the region of the page is not released even though no data remains in the page due to the deletion of the data. Accordingly in general, the storage efficiency becomes poor with repetition of insertion and deletion of the data, and the access performance becomes poor concomitantly. To suppress the deterioration of the performance, a method (rearrangement) has been employed generally, in which the access is inhibited at the proper timing, the data stored in the index is sent out temporarily to the region, and the data is re-packed.

As described hereinabove, two pages are not locked simultaneously in the related art 2. Therefore, the parallel execution performance is high. On the other hand, because the page is referred by mistake in some cases as described in the related art 1, the region cannot be released successively even though the data is deleted.

BRIEF SUMMARY OF THE INVENTION

As obvious in the description of the related art 1 and the related art 2, the capability of release processing of the region in the data deletion processing and the high capability of parallel execution have been considered to be in tradeoff relation.

One object of the present invention is to provide a system having the data structure in which a plurality of objects are correlated by the pointer and the processing for reference, update, insertion, and deletion of the object can be operated in parallel, that is characterized in that the parallel execution capability of reference, update, and insertion in the system is high, and the deletion processing is carried out in parallel with the reference, update, and insertion processing at high performance.

Another object of the present invention is to provides a system that is capable of reclaiming the free object region to improve the storage efficiency and access efficiency without suppression of data reference, update, and insertion to the B-tree index, the storage efficiency and access efficiency of which B-tree index have been lowered due to repetition of the data insertion and deletion (the object that has been deleted but retains the un-released region increases, or the target object is accessed through needless objects).

In the case of the present invention, for transfer between objects by tracing the pointer in reference, update, and insertion processing, the lock of an un-transferred object is released and then the lock is set to the transferred object to thereby improve the reference, update, and insertion parallel execution capability. At that time, the IS-mode (in the case of reference processing) or the IX-mode (in the case of update and insertion processing) is set to the object group at the beginning of the processing, and the lock is released after the processing is completed.

On the other hand, for the deletion processing, after the pointer to the deletion target is separated or relocated and all processing that acquires the lock to the object group is completed, the region of the deletion target object is released.

DETAILED DESCRIPTION OF THE PREFERRED EMBODIMENTS

Embodiment 1

Figure 9:
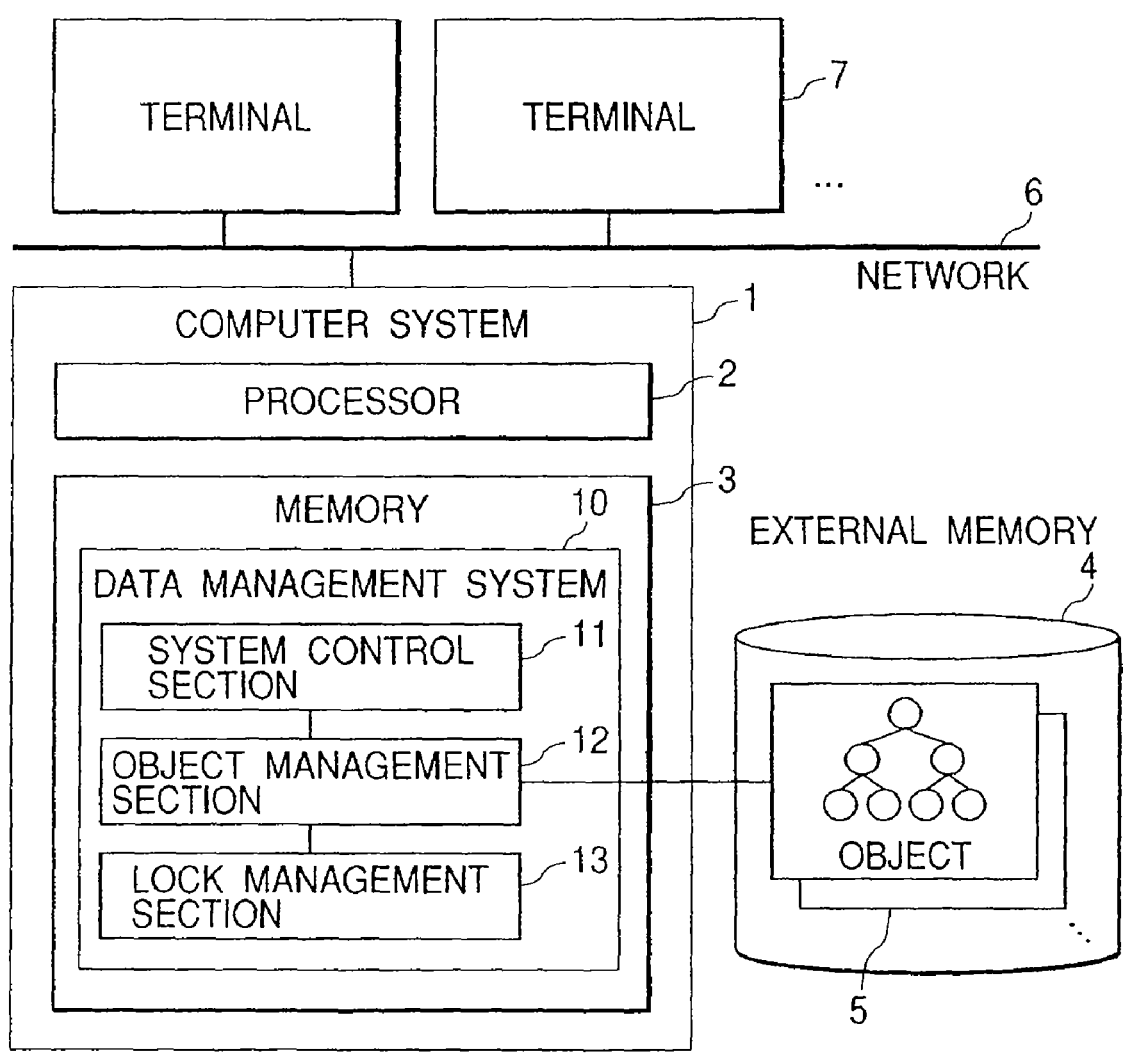
FIG. 9 is a diagram showing an exemplary system structure for realizing the present invention.

An exemplary system structure for realizing the present invention is shown in FIG. 9. The exemplary system structure described herein is used commonly for embodiments 1 to 3. The system is provided with a computer system 1 having a processor 2 and memory 3, an external memory 4 connected to the computer system 1, and a plurality of terminals 7 connected to the computer system 1 through a network 6.

A data management system 10 expressed in the form of a program that is interpretable by the processor 2 is provided in the memory 3, and the command is read and the arithmetic processing is carried out by the processor 2. The data management system comprises a system control section 11, an object management section 12, and a lock management section 13. The system control section 11 receives the reference, insertion, update, and deletion request from the terminal 7, analyses the request content, leaves the control to the object management section 12, and sends the processing result to the terminal 7 through the network 6. The object management section 12 manages the object 5 stored in the external memory 4 according to the command received from the system control section 11. The lock management section 12 provides the lock function to a specified resource to the object management section 12.

Figure 1:
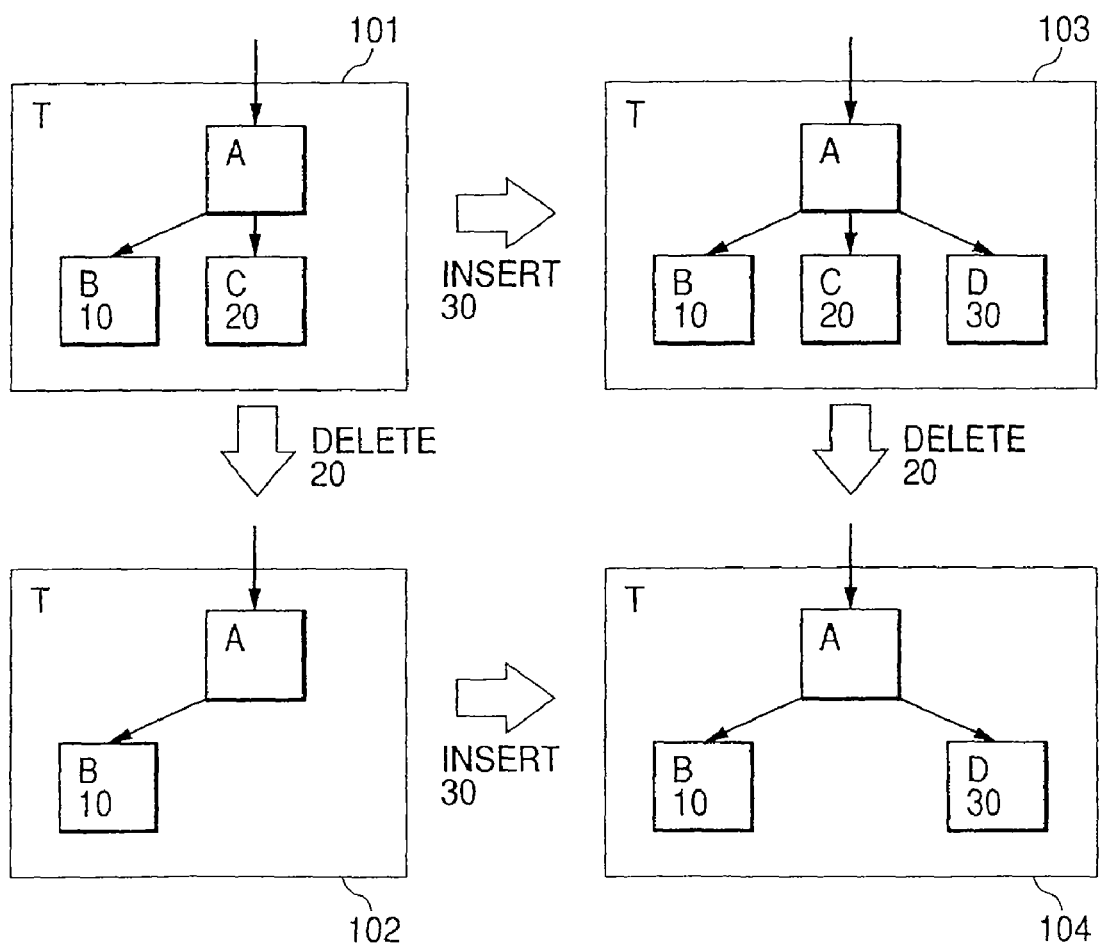
FIG. 1 is a diagram showing the data structure of the related art 1 and an embodiment 1.

An exemplary method that exhibits high reference, update, and insertion parallel execution capability and that is capable of deletion processing in parallel with reference, update, and insertion processing is disclosed with reference to FIG. 3A to FIG. 3D and FIG. 4, in comparison with FIG. 1 used for description of the related art 1.

Figure 2A:
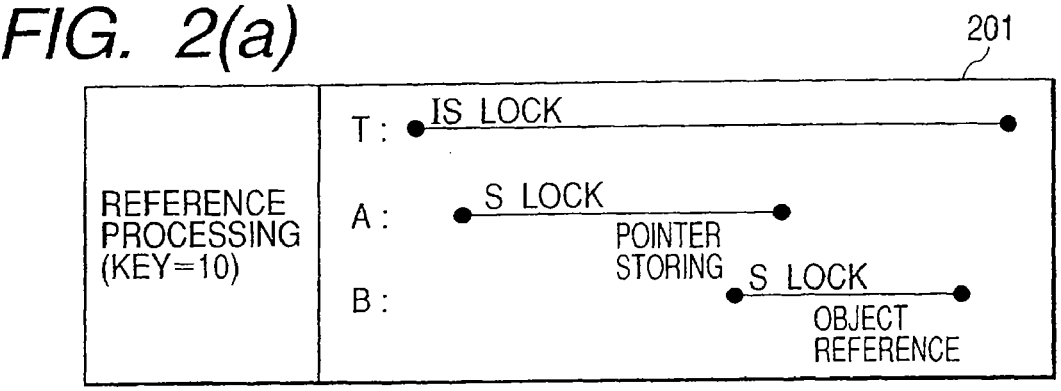
FIG. 2A to FIG. 2D are diagrams showing time charts in the related art 1
Figure 2B:
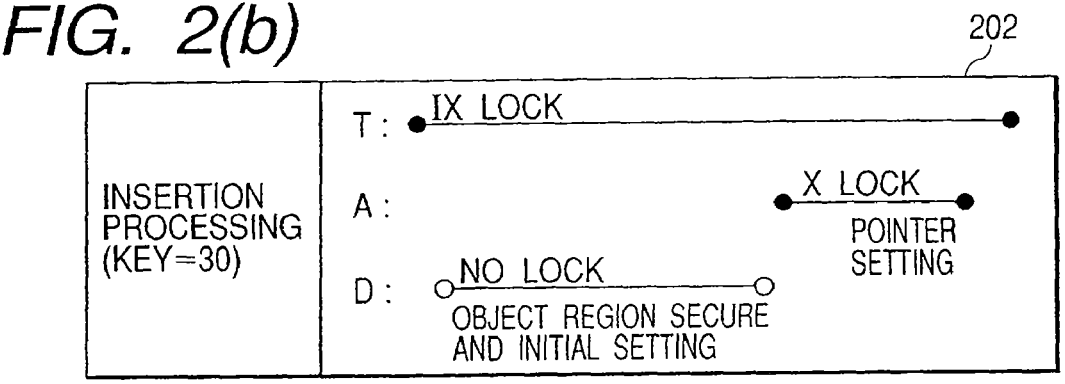
Figure 2C:
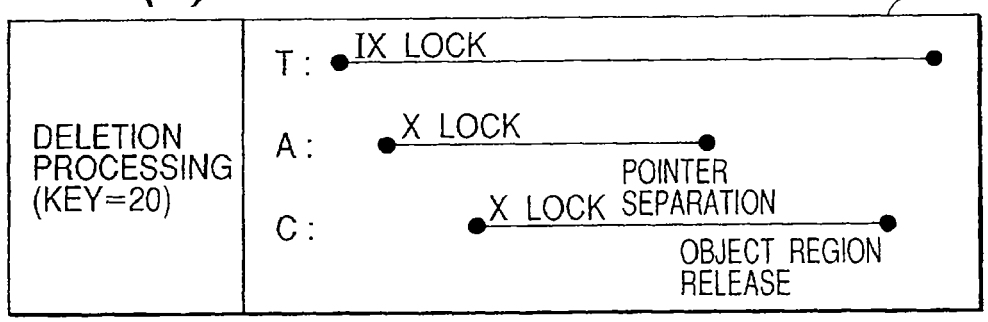
Figure 2D:
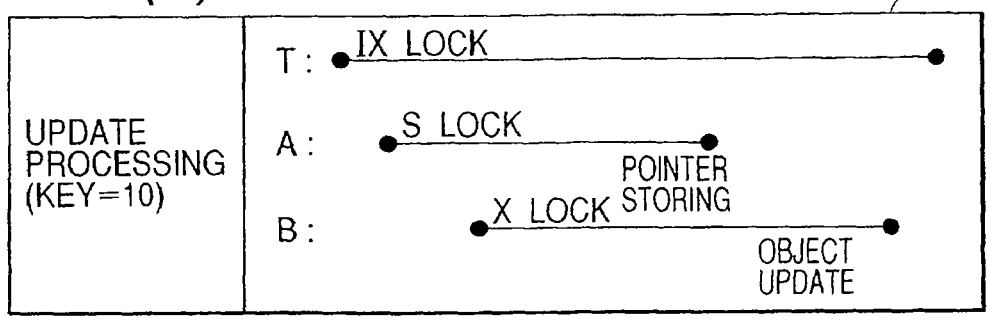
Figure 3A:
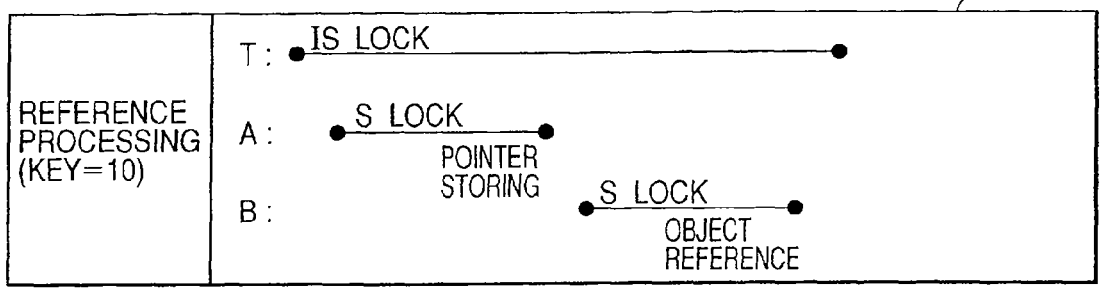
FIG. 3A to FIG. 3D are diagrams showing time charts in the embodiment 1 of the present invention.
Figure 3B:
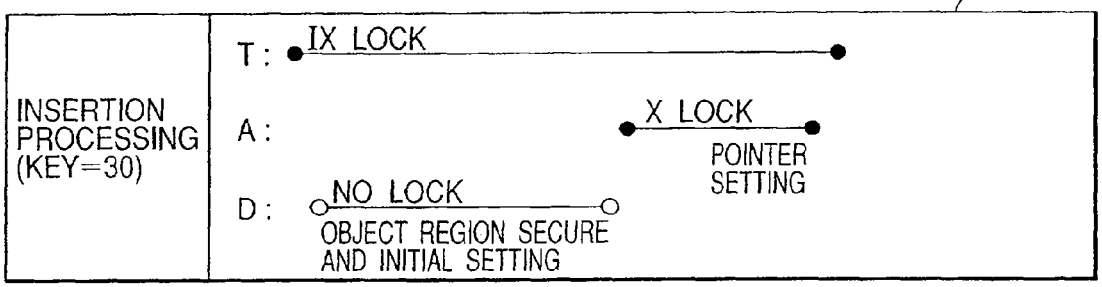

Numeral 301 of FIG. 3A is a time chart showing the reference processing in the present embodiment. In comparison with 201 of FIG. 2A, the releasing timing of the lock of the object A is replaced with the setting timing of the S-mode lock to the object B. In detail, in the related art, the lock is set to the object A, the value of the pointer to the object B is stored, the lock is then set to the object B, and the lock of the object A is released thereafter. On the other hand, in the present embodiment, the lock is set to the object A, the value of the pointer to the object B is stored, and the lock of the object A is released. Thereafter, the lock is set to the object B. Numeral 302 of FIG. 3B is a time chart showing the insertion processing in the present embodiment. This is the same as 201 of FIG. 2.

Figure 3C:
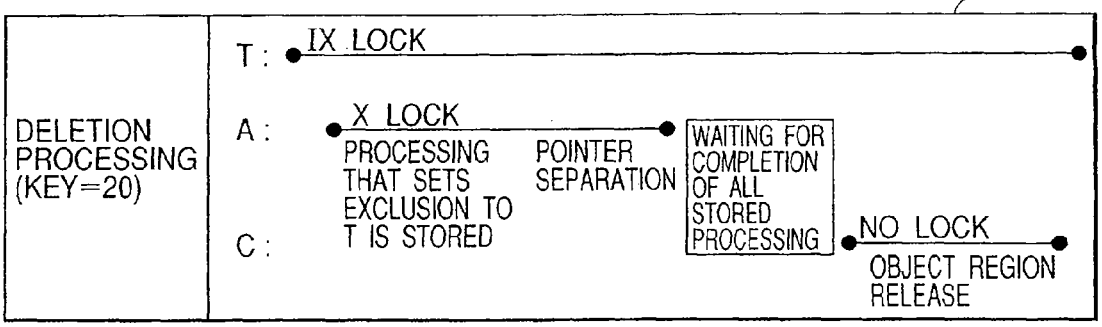
Figure 3D:
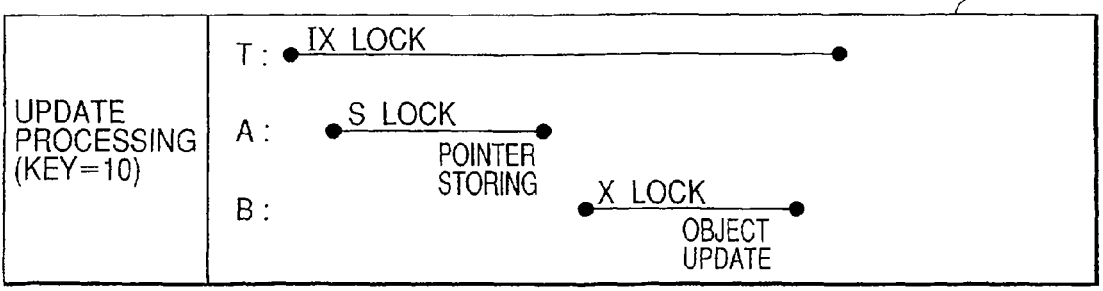

Numeral 304 of FIG. 3D is a time chart for showing the update processing in the present embodiment. In comparison with 204 of FIG. 2D, the lock releasing timing of the object A is replaced with the X-mode lock setting timing of the object B.

Numeral 303 of FIG. 3C is a time chart showing the deletion processing in the present invention. The numeral 303 of FIG. 3C is significantly different from 204 of FIG. 2D, and described with comparison. Setting of the IX-mode lock to the object group T and setting of the X-mode lock to the object A are the same, and all the processing that acquires the lock of the object group T is stored. Thereafter, the pointer to the object C that is the deletion target is separated from the object A. In this embodiment, at that time the completion of all the processing stored as described hereinabove is waited. A waiting method in which the completion is notified to the deletion processing from the processing side that sets the lock to the object group T at the time point when the lock is released or a method in which the deletion processing checks the completion of other processing at every certain interval may be employed as the method for waiting. After the completion of all the processing stored as described hereinabove is detected by employing any one of the above-mentioned methods, the region of the object C is released.

Figure 4:
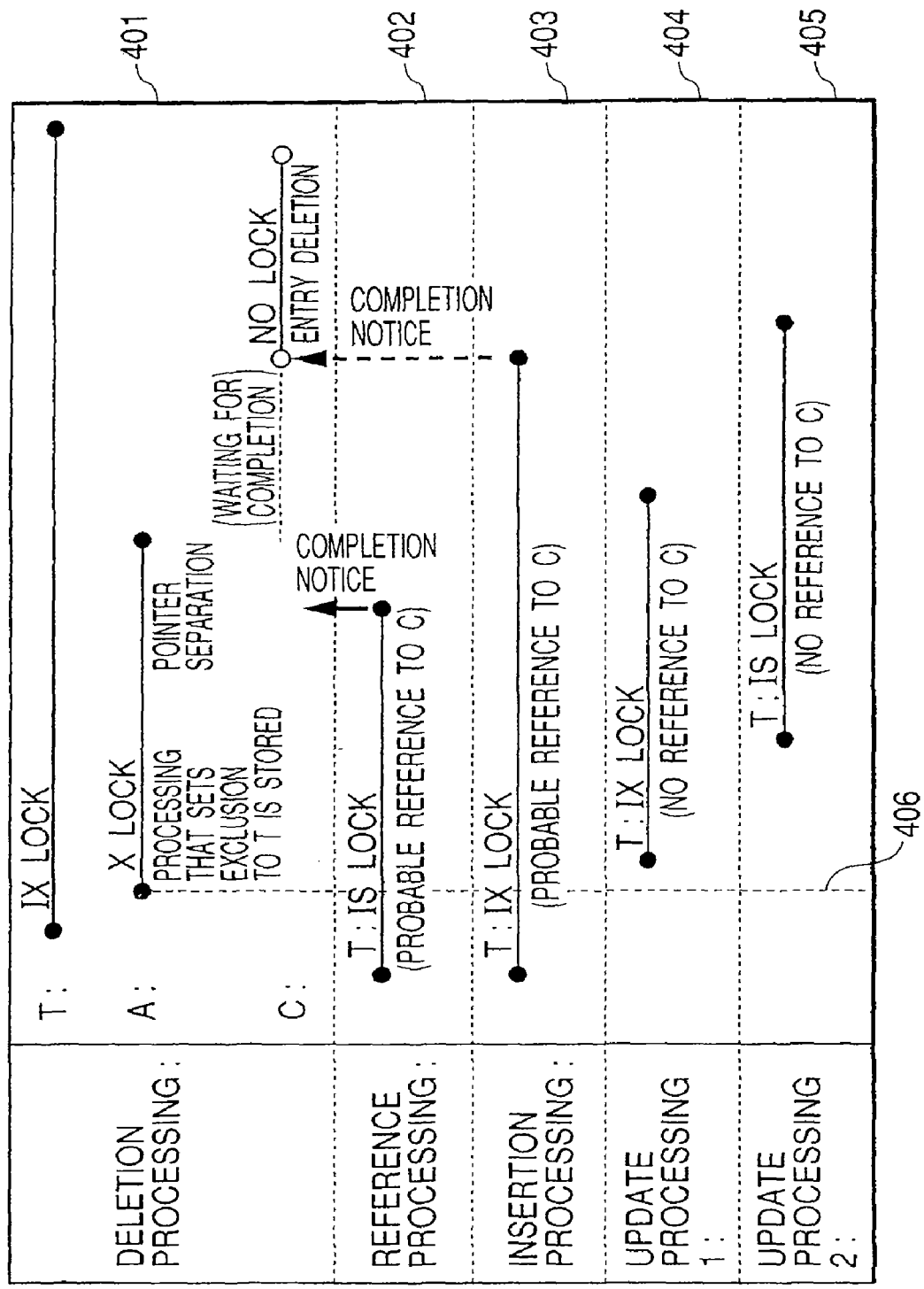
FIG. 4 is a diagram showing the parallel processing in the embodiment 1 of the present invention.

Because another processing will not take an access to the released region, it is not necessary to set the lock to the object C. The reason is described exemplarily with reference to FIG. 4. FIG. 4 shows that the deletion processing 401, reference processing 402, insertion processing 403, update processing 404, and update processing 405 are carried out in parallel. The processing that does not set the lock to the object group T at the time point of 406, namely the time point just after the X-mode lock is set to the object A in the deletion processing 401, (herein, the update processing 404 and update processing 405) cannot access to the object C. The reason is that though it is necessary to access to the object A at the time point when the pointer to the object C is set before access to the object C, because the deletion processing 401 inhibits with the X-mode, the pointer to the object C has been separated when the object A is seen with the update processing 404 and update processing 405. Furthermore, in some cases, the reference processing 402 and the update processing 403 acquire the data with seeing the object C, the reason is that these processing have detected the completion of the all.

The above-mentioned IS-mode and IX-mode are examples, and the lock mode that is equivalent to these group or that is lower in the parallel execution capability may be used instead.

According to the above-mentioned processing method, the parallel execution capability for reference, insertion, and update processing is improved in comparison with the conventional processing, and the mis-access of other processing to the region that has been released by deletion processing is prevented. More in detail, because one processing will not lock two objects simultaneously in the reference, insertion, and update processing in the above-mentioned embodiment, high parallel execution capability that is equivalent to the conventional art can be realized. Furthermore, because the region of the object is released after completion of another processing that sets the lock to the deletion processing target object group after the pointer has been separated in the deletion processing, the region is released safely without inhibition of execution of other processing.

Embodiment 2

The second embodiment will be disclosed with reference to FIG. 5 and FIG. 6A to FIG. 6D.

Figure 5:
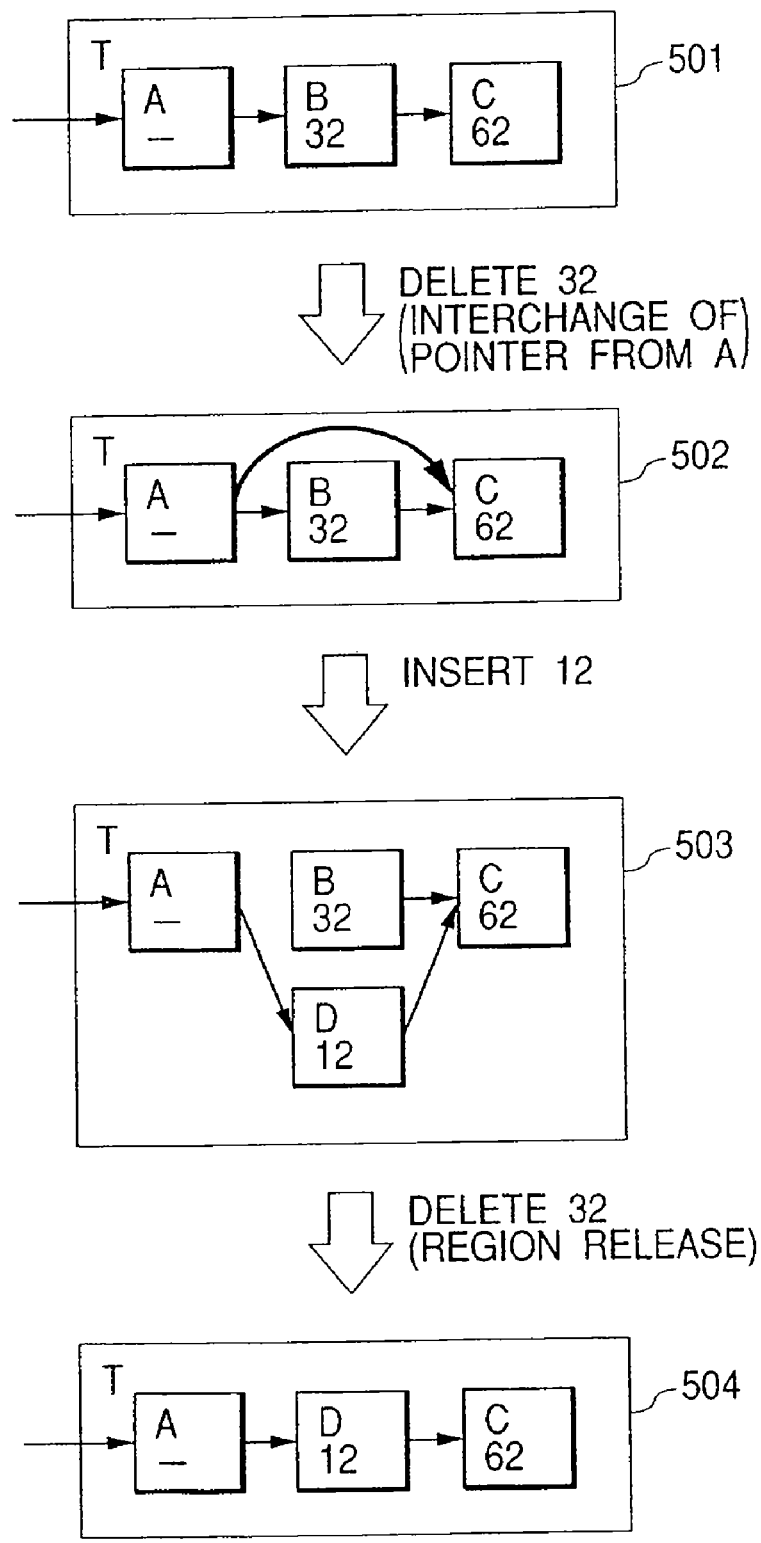
FIG. 5 is a diagram showing the data structure in an embodiment 2 of the present invention.

Numeral 501 shown in FIG. 5 is a typical data structure used for managing the data corresponding to a certain hash value by the chain (herein, the hash function is defined as remainder obtained when a key value is divided by 10, and it is assumed to be a part for managing the key corresponding to a hash value=2 and the data). The procedure carried out in the case that the deletion processing of the key value of 32 and the insertion processing of the key value of 12 are requested to the data structure as described hereinabove will be described herein under together with the time charts of the processing shown in FIG. 6.

In the deletion processing 601 shown in FIG. 6, deletion of the object B is requested. At first, the IX-mode lock is set to the object group T, and the X-mode lock is set to the object A. The pointer to the object B stored in the object A is acquired, (as the lock of the object A is maintained) the X-mode lock is set to the object B, and the object B is accessed. It is confirmed that there is the object B, namely the object of the key value of 32, and all the processing that sets the lock to the object group T is stored at this time point (it is assumed that the insertion processing 602 is carried out in parallel at this time point and the lock is set to the object group T). The pointer to the object B stored in the object A is reset to the pointer stored in the object B (the pointer to the object C) (replacement of the pointer), the lock of the object A and the object B is released (502 in FIG. 5), and completion of the stored processing is waited for.

On the other hand, in the insertion processing 602, the IX-mode lock is set to the object group T, the object region for insertion is secured (assumed to be the object D), and the key value of 12 and correlated data are set. Subsequently, the X-mode lock is set to the object A (if the deletion processing is maintaining the lock, the lock is set after releasing), the pointer stored in the object A is set to the pointer to the object D, the pointer from the object A is replaced so as to point the object D, the lock of the object A is released, and the lock of the object group T is released finally to thereby complete the insertion processing (503 in FIG. 5).

The lock of the object T is released in the insertion processing 602. Thereby, the deletion processing 601 releases the region of the object B (without setting the lock), the lock of the object group T is released, and the deletion processing is completed (504 in FIG. 5).

Figure 6A:
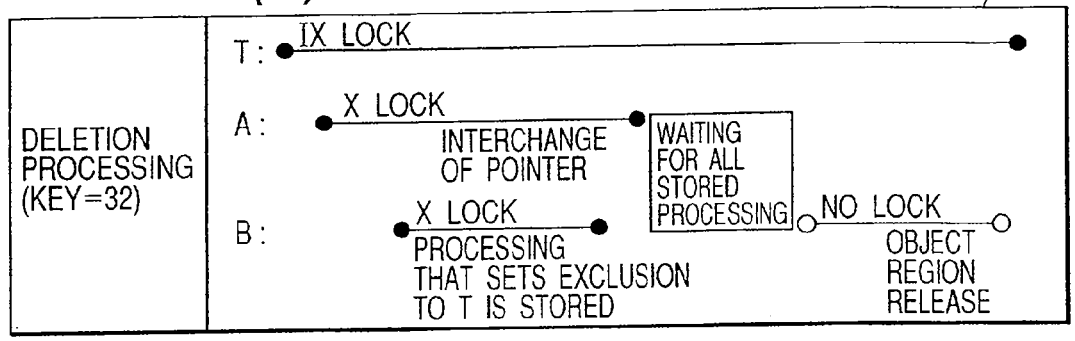
FIG. 6A to FIG. 6D are diagrams showing time charts in the embodiment 2 of the present invention.
Figure 6B:
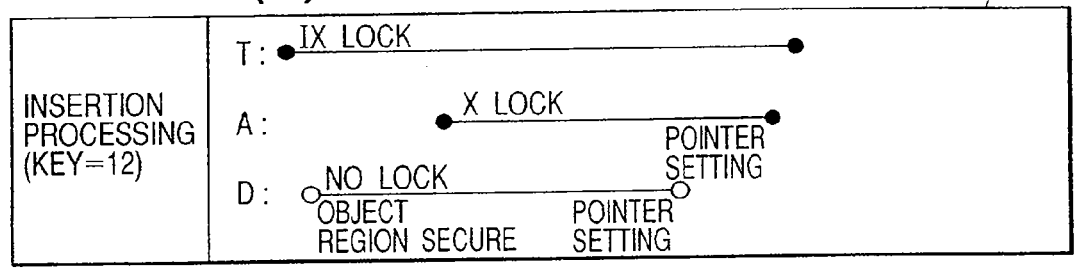
Figure 6C:
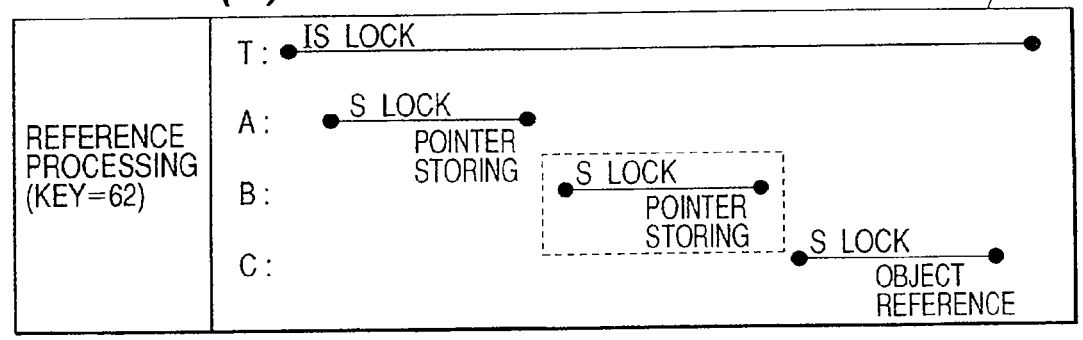

Next, the procedure of the reference processing (key value of 62) 603 will be described herein under. At first, the IS-mode lock is set to the object group T, the pointer is traced successively from the object A to search the object of the key value of 62. For transfer between objects, the lock of the object of the starting point is released and then the S-mode lock is set to the transfer target object. In the case that the operation is carried out in parallel with the above-mentioned deletion processing 601, if the state at the time when the object A is accessed is the state of 502 in FIG. 5, the pointer to the object C is stored without access to the object B. Therefore, the processing enclosed with the dashed line of 603 in FIG. 6C is not carried out. The processing enclosed with the dashed line is carried out while the object B is remaining in the state 501. At that time, access of the object A causes storage of the pointer to the object B, and the pointer to the object C is stored with the processing enclosed with the dashed line. The processing changes depending on the reference timing as described hereinabove.

Figure 6D:
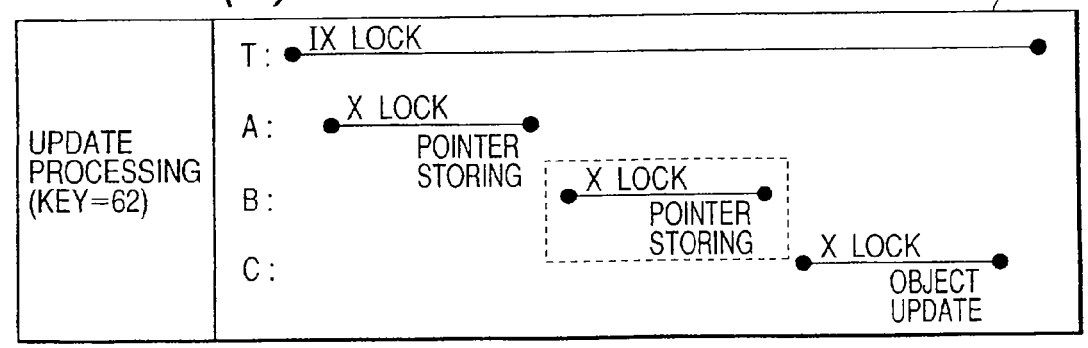

Subsequently, the procedure of update processing (key value of 62) 604 will be described herein under. At first, the IX-mode lock is set to the object group T, the pointer is traced successively from the object A to search the object of the key value of 62, and the correlated data is updated when the object of the key value of 62 is found. For transfer between objects, the lock of the object located at the starting point is released and then the X-mode lock is set to the transfer target object. In the case that the operation is carried out in parallel with the above-mentioned deletion processing 601, if the state at the time when the object A is accessed is the state 502 in FIG. 5, the processing enclosed with the dashed line of 604 in FIG. 6D is not carried out without access to the object B.

According to the above-mentioned processing method, high parallel execution capability of the reference, insertion, and update processing can be realized without mis-access to the region that has been released by deletion processing. Furthermore, the operation is realized similarly to the embodiment 1 also in the data management in which the hash function is used as described herein under. In the reference, insertion, and update processing, one processing has high parallel execution capability without setting the lock to two objects simultaneously, and in the deletion processing, the pointer to the deletion target object is separated, and after completion of other processing that set the lock to the object group the region is released. Thereby, the region is released without inhibition of execution of other processing and without use of erroneous data.

Embodiment 3

A free page reclaim processing method that is capable of parallel execution with the data deletion and data insertion processing in the B-tree index described in the related art 2 will be disclosed with reference to FIG. 7 and FIG. 8A to FIG. 8C. The free page reclaim processing is executed instead of the rearrangement at the proper time point when the storage efficiency decreases concomitantly with repeated insertion and deletion of the data and the access performance becomes poor concomitantly.

Figure 7:
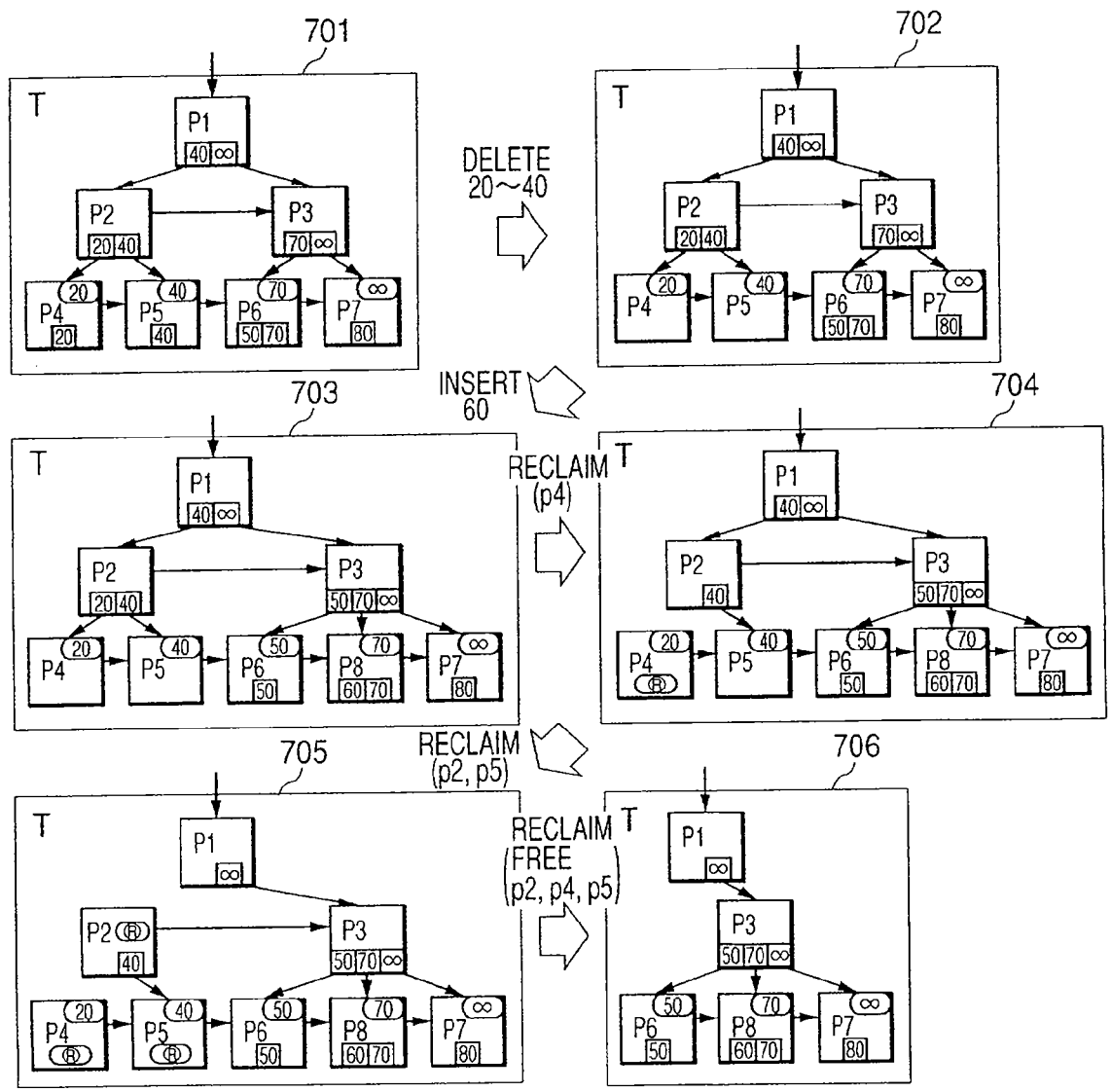
FIG. 7 is a diagram showing the data structure in a related art 2 and an embodiment 3 of the present invention.
Figure 8A:
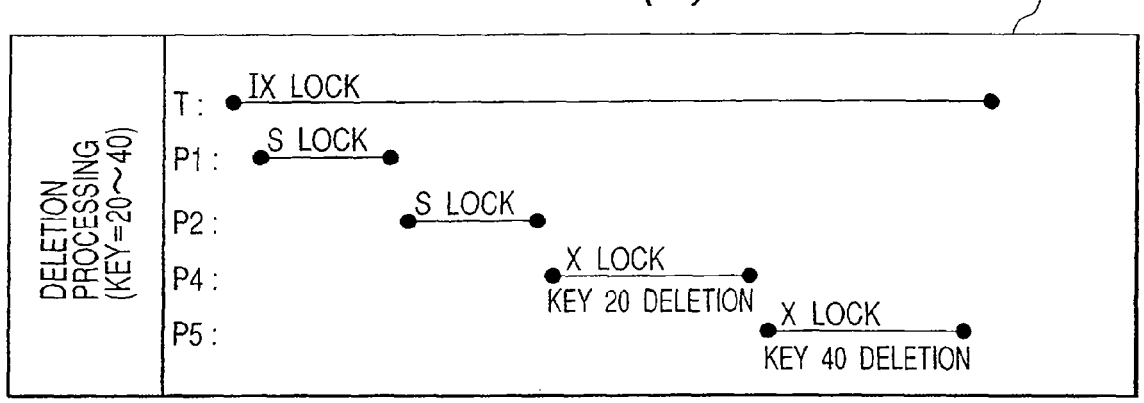
FIG. 8A to FIG. 8C are diagrams showing time charts in the related art 2 and embodiment 3 of the present invention.
Figure 8B:
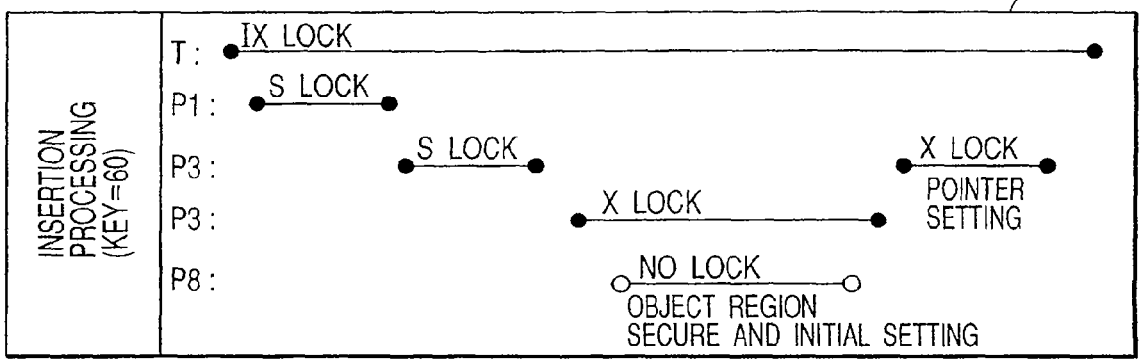
Figure 8C:
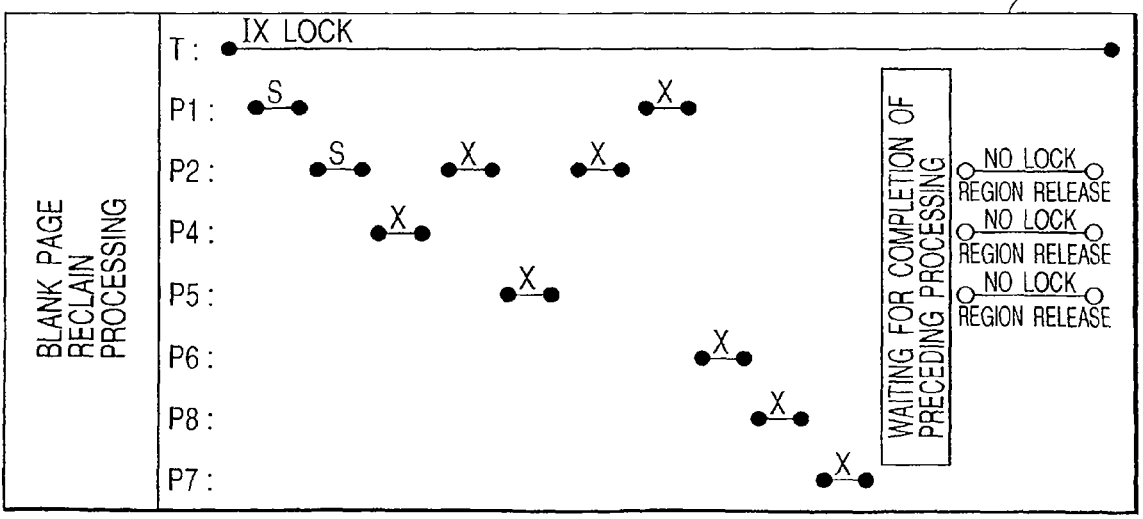

The process procedure used in the case that the free page reclaim processing is executed in the state of 703 shown in FIG. 7 is shown in 803 in FIG. 8C. At first, the IX-mode lock is set to the whole B-tree index. The lock mode to the page is enclosed in [ ] in the following description. Next, the page is traced from the root page toward the leftmost leaf page (page P1 [S], P2 [S], and P4 [X]). It is confirmed that the number of data is 0 in the leaf page P4, and a flag for indicating that this page is to be reclaimed is set (symbol "R" in a circle in the page P4 of 704 in FIG. 7). Subsequently, the page P2 that is located at the upper position than the page P4 is accessed [X] and the pointer to the page P4 is separated (704 in FIG. 7). Then, the pate P5 that is located at the right side of the page P4 is accessed [X] to confirm that the number of data is 0, and a flag for indicating that this page is to be reclaimed is set. Next, the page P2 that is located at the upper position is accessed [X], the pointer to the page 5 is separated. Then, it is confirmed that no key remains in the page P2, and a flag for indicating that the page is to be reclaimed to the page P2 is set. Subsequently, the page P1 that is located at the position upper than the page 2 is accessed [X], and the pointer to the page P2 is separated (705 in FIG. 7). The page P6 that is located on the right side of the page P5 is accessed [X] to confirm that the number of data is one or more, the page P8 that is located on the right side of the page P6 is accessed [X] to confirm that the number of data is one or more, the page P7 that is located on the right side of the page P8 is accessed [X] to confirm that the number of data is one or more, and thus the flag setting and pointer separation of the reclaimable page are completed. At this time point, the processing that sets the lock to the whole B-tree index is stored, and the completion of the processing is waited. After all the stored processing has been completed, the region of the pages P2, P4, and P5 that is to be reclaimed is released, and the lock of the whole B-tree index is released to complete the free page reclaim processing (706 in FIG. 7).

In the final form obtained by means of the free page reclaim processing method described hereinabove, the key that is stored in the page from which the region is released is taken over by the page that is located on the right side. For example, the page P6 is served to store the data of the key value of 50 or lower. Concomitantly, in the case that setting of a flag for indicating that the page is to be reclaimed is detected on the accessed page in the reference, insertion, and update processing, the processing is changed partially so that the page is transferred to the page located on the right side for accessing.

By applying processing method described hereinbefore, the region of the free page is recovered without significant damage of the parallel execution capability for reference, insertion, and update processing and without suppression of data reference, update, and insertion, and it is possible to improve the storage efficiency and access efficiency.

As described hereinbefore in the embodiments, the system having the data structure correlated to a plurality of objects by means of the pointer that operates a plurality of processing for reference, insertion, and deletion of the object in parallel is highly capable of parallel execution of the reference, update, and insertion and is capable of executing the deletion processing in parallel with the reference, update, and insertion processing.

Furthermore, the system is capable of suppressing the data reference, update, and insertion of the B-tree index that has become poor in the storage efficiency and access efficiency due to repeated data insertion and deletion and is capable of reclaiming the region of the free page without temporary use of the resource, and it is possible to improve the storage efficiency and access efficiency.

According to the present invention, the system is capable of executing the reference, insertion, and update processing in parallel, and is capable of preventing other processing from mis-accessing to the region that has been released by deletion processing, and the releasing (reclaim) after deletion processing is made possible.

The invention claimed is:

1. In a data processing system having an object management section and a lock management section executed by a processor, and a data structure comprising: a plurality of objects each comprising a data unit in a region, wherein data in each region are secured and released together; a plurality of object groups each comprising some of the plurality of objects; and a plurality of pointers each of which point from one object to a different object in the same object group, a data processing method for executing reference, update, insertion and deletion processes in parallel on the plurality of objects, the data processing method for deleting a target object, comprising:

in the lock management section:
- a first step for acquiring a first lock to an object group, wherein the target object is included in the object group, and
- a second step for acquiring a second lock to a specific object, wherein the specific object accesses the target object by a pointer, the specific object and the target object being in the same object group, and wherein the target object does not acquire the second lock; and in the object management section:
- a third step for storing information related to the reference, update and insertion processes that acquired the first lock to the target object in the same object group,
- a forth step for removing the pointer from the target object,
- a fifth step for determining completion of the reference, update and insertion processes that acquired the first lock to the target object in the same object group on the basis of the stored information of the third step, and
- a sixth step for releasing a data unit in a region corresponding to the target object when the reference, update and insertion processes are determined to be completed in the fifth step.

2. The data processing method according to 1, wherein, in the fifth step, the object management section receives notification of the completion of the reference, update and insertion processes that acquired the first lock to the target object in the same object group as the target object.

3. The data processing method according to 1, wherein, during execution of the reference, update, insertion and deletion processes, the object management section locates the target object by tracing a pointer from an original object to the target object, wherein the original object and the target object are in the same object group.

4. A data processing system comprising a processor having a data structure comprising: a plurality of objects each comprising a data unit in a region, wherein data in each region are secured and released together; a plurality of object groups each comprising at least some of the plurality of objects; and a plurality of pointers each of which point from one object to a different object in the same object group, the data processing system executing object reference, update, insertion and deletion processes in parallel, the data processing system comprising an object management section and a lock management section executed by the processor, the lock management section comprising code that is executed by the processor to perform steps comprising:
- acquiring a first lock to an object group, wherein the target object is included in the object group; and
- accessing a specific object and the target object in the same object group using a pointer, and acquires a second lock to the specific object, wherein the lock management section does not acquire the second lock to the target object; and the object management section comprising code that is executed by the processor to perform steps comprising:
- storing information related to the reference, update and insertion processes that acquired the first lock to the target object in the same object group;
- removing the pointer from the target object;
- determining whether the reference, update and insertion processes that acquired the first lock to the target object in the same object group are completed, wherein the determination is made on the basis of the stored information; and
- releasing a data unit in a region corresponding to the target object when the reference, update and insertion processes that acquired the first lock to the target object in the same object group are determined to be completed.

5. The data processing system according to 4, wherein the object management section receives notification of the completion of the reference, update and insertion processes that acquired the first lock to the target object in the same object group as the target object.

6. The data processing system according to 4, wherein, when referencing, updating, inserting and deleting the target object, the object management section locates the target object by tracing a pointer from an original object of the object group.

* * * * *